United States Patent
Ray et al.

(10) Patent No.: US 11,108,583 B2
(45) Date of Patent: Aug. 31, 2021

(54) COLLABORATIVE LEARNING AND ENABLING SKILLS AMONG SMART DEVICES WITHIN A CLOSED SOCIAL NETWORK GROUP

(71) Applicant: INTERNATIONAL BUSINESS MACHINES CORPORATION, Armonk, NY (US)

(72) Inventors: Shubhadip Ray, Secaucus, NJ (US); Sarbajit K. Rakshit, Kolkata (IN); Craig M. Trim, Ventura, CA (US); Garfield Vaughn, South Windsor, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 16/194,763

(22) Filed: Nov. 19, 2018

(65) Prior Publication Data
US 2020/0162277 A1 May 21, 2020

(51) Int. Cl.
*H04L 12/28* (2006.01)
*G06K 9/00* (2006.01)
*G06N 5/02* (2006.01)

(52) U.S. Cl.
CPC ...... *H04L 12/2814* (2013.01); *G06K 9/00664* (2013.01); *G06N 5/025* (2013.01); *H04L 12/281* (2013.01)

(58) Field of Classification Search
CPC .............. H04L 12/2814; H04L 12/281; G06K 9/00664; G06N 5/025
See application file for complete search history.

(56) References Cited

U.S. PATENT DOCUMENTS

| 7,047,279 | B1 | 5/2006 | Beams et al. |
| 9,838,970 | B2 | 12/2017 | Jepson et al. |
| 9,947,235 | B2 | 4/2018 | Kang et al. |
| 10,003,620 | B2 | 6/2018 | Deshpande et al. |
| 2005/0235092 | A1* | 10/2005 | Ballew ............... G06F 9/5066 710/316 |
| 2008/0256008 | A1 | 10/2008 | Kwok |
| 2012/0303837 | A1* | 11/2012 | Raschke ............... G06F 9/44 710/11 |
| 2014/0089232 | A1 | 3/2014 | Buibas et al. |

(Continued)

OTHER PUBLICATIONS

Anonymous, "What are the privacy settings for groups?", https://www.facebook.com/help/220336891328465?helpref=about_content, accessed Nov. 15, 2018, 2 pages.

*Primary Examiner* — Tonia L Dollinger
*Assistant Examiner* — Jihad K Boustany
(74) *Attorney, Agent, or Firm* — Anthony England; Andrew D. Wright; Roberts Calderon Safran & Cole, P.C.

(57) ABSTRACT

Methods and systems for collaborative learning and enabling skills among smart devices within a closed social network group are disclosed. A method includes: receiving, by a computing device from a first smart device, a request for steps to perform an activity; determining, by the computing device, the steps to perform the activity using a knowledge corpus; translating, by the computing device, the steps into a format that is compatible with the first smart device; and sending, by the computing device, the translated steps to the first smart device.

19 Claims, 4 Drawing Sheets

(56) References Cited

U.S. PATENT DOCUMENTS

| | | | |
|---|---|---|---|
| 2015/0066158 A1* | 3/2015 | Kim | H04L 12/283 700/3 |
| 2015/0081470 A1* | 3/2015 | Westphal | G06Q 30/0631 705/26.7 |
| 2016/0180248 A1 | 6/2016 | Regan | |
| 2016/0269405 A1* | 9/2016 | Suzuki | H04L 63/0876 |
| 2017/0099383 A1 | 4/2017 | Lee et al. | |
| 2017/0142230 A1* | 5/2017 | Hou | H04L 12/282 |
| 2018/0077194 A1 | 3/2018 | Rusakov et al. | |
| 2018/0096323 A1* | 4/2018 | Baber | G06Q 20/385 |
| 2019/0190737 A1* | 6/2019 | Kim | G06N 5/025 |
| 2019/0238358 A1* | 8/2019 | Hurewitz | H04L 12/4625 |
| 2020/0052925 A1* | 2/2020 | Mai | G06N 5/048 |
| 2020/0084060 A1* | 3/2020 | Bang | H04L 12/2814 |
| 2020/0162287 A1* | 5/2020 | Wang | H04L 12/4641 |

* cited by examiner

COLLABORATIVE LEARNING AND ENABLING SKILLS AMONG SMART DEVICES WITHIN A CLOSED SOCIAL NETWORK GROUP

BACKGROUND

The present invention generally relates to computing devices and, more particularly, to methods and systems for collaborative learning and enabling skills among smart devices within a closed social network group.

Smart devices are home appliance devices that include artificial intelligence capabilities and are able to acquire new skills and communicate with other home appliance devices and/or internet of things (IoT) sensors to perform activities in an effective manner.

SUMMARY

In a first aspect of the invention, there is a method that includes: receiving, by a computing device from a first smart device, a request for steps to perform an activity; determining, by the computing device, the steps to perform the activity using a knowledge corpus; translating, by the computing device, the steps into a format that is compatible with the first smart device; and sending, by the computing device, the translated steps to the first smart device.

In another aspect of the invention, there is a computer program product that includes a computer readable storage medium having program instructions embodied therewith. The program instructions are executable by a computing device to cause the computing device to: obtain photographs of an area of an activity; send the photographs and a request for steps to perform the activity to a knowledge management system; receive the steps to perform the activity from the knowledge management system; and perform the activity by following the steps received from the knowledge management system.

In another aspect of the invention, there is a system that includes: a hardware processor, a computer readable memory, and a computer readable storage medium associated with a computing device; program instructions configured to receive, from a first smart device, a request for steps to perform an activity; program instructions configured to determine the steps to perform the activity using a knowledge corpus; program instructions configured to translate the steps into a format that is compatible with the first smart device; and program instructions configured send the translated steps to the first smart device, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for collaborative learning and enabling skills among smart devices within a closed social network group. As described herein, aspects of the invention include a method and system that create a closed social network group including a plurality of smart devices, receive metadata from the smart devices and store the received metadata in a knowledge corpus, receive activity logs from the smart devices, analyze the activity logs and build the knowledge corpus, receive a request from a smart device for steps to perform a particular activity, obtain the steps from the knowledge corpus, translate the steps for the smart device, and send the translated steps to the smart device.

In embodiments, smart devices self-learn based on a user-assigned activity and the user's feedback. For example, if a cleaning activity is to be performed by a smart device such as a cleaning robot, then the cleaning robot will perform the activity based on initial guidance from the user and will self-learn, so that going forward, the cleaning robot may not need any further guidance if a similar cleaning activity is to be performed. If any new type of cleaning activity is to be performed, then the cleaning robot will need guidance from the user about the activity. Accordingly, the cleaning robot will wait for the user to perform the activity. For example, the cleaning robot may not have performed any oily floor cleaning, so it will ask for guidance from the user.

A problem arises when the user is not available to provide guidance about the activity. Embodiments address this problem by providing a mechanism by which a smart device such as the cleaning robot is able to obtain information about how to perform the activity from cleaning robots of friends of the user (i.e., other connected cleaning robots of a closed social network group) which have performed a similar activity and accordingly can perform the activity without assistance from the user. Accordingly, embodiments improve the functioning of a computer by providing methods and systems by which smart devices collaborate and share knowledge and learn to perform new activities. Additionally, implementations of the invention use techniques that are, by definition, rooted in computer technology (e.g., artificial intelligence, cognitive computing techniques, and computer vision). For example, computer vision includes using computers to acquire, process, analyze, and understand digital images.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
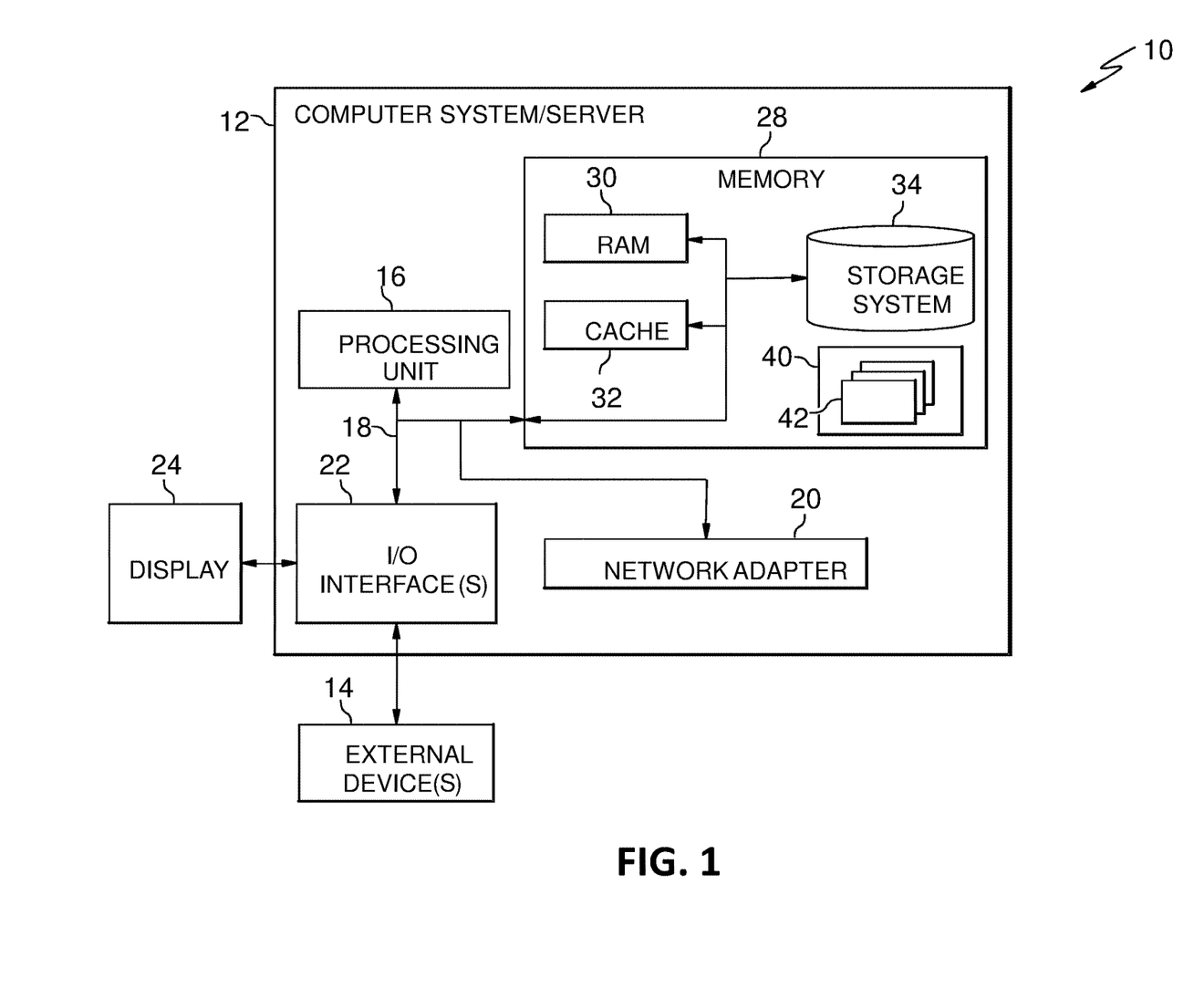
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
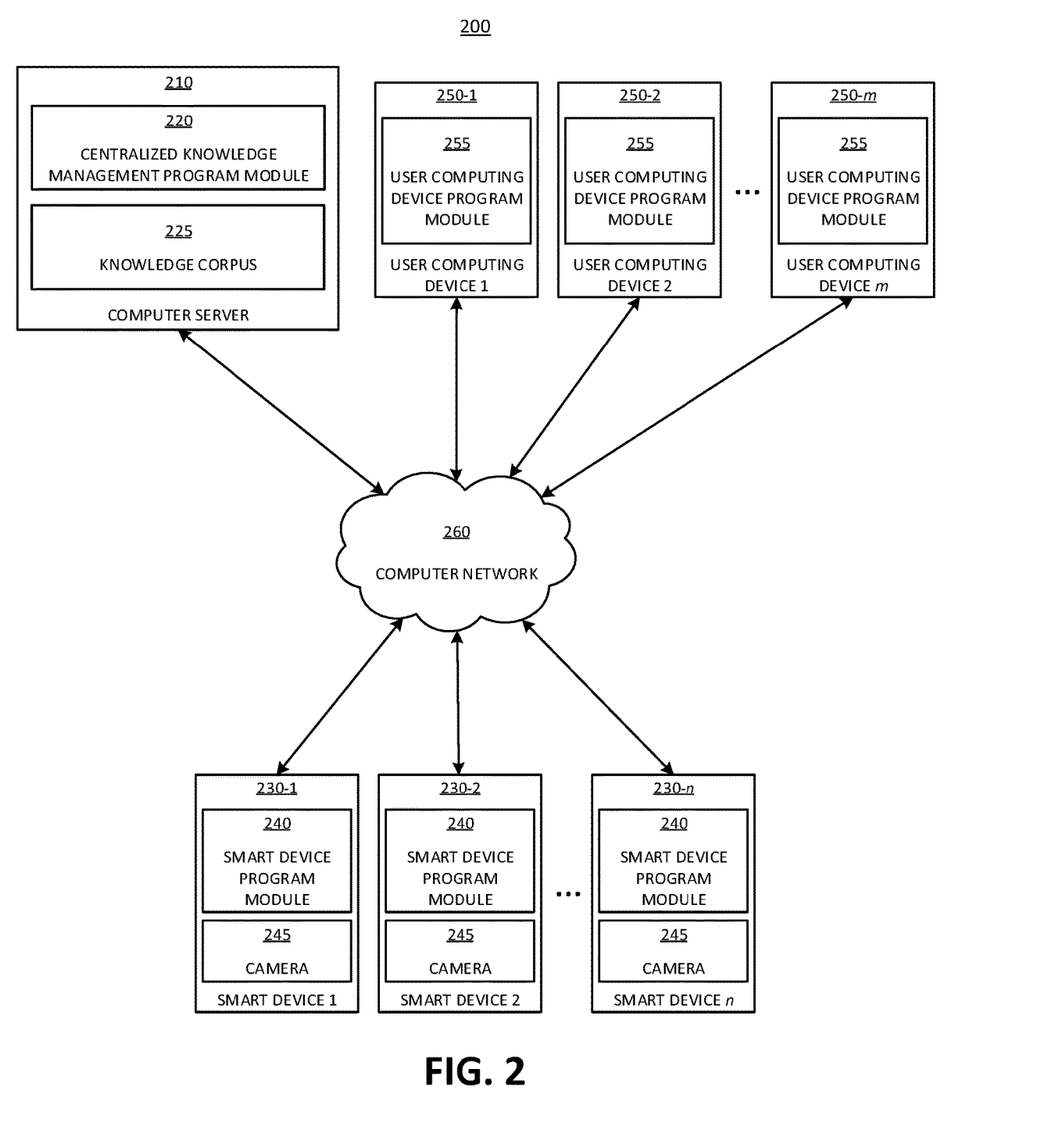
FIG. 2 depicts an illustrative environment in accordance with aspects of the invention.

FIG. 2 depicts an illustrative environment 200 in accordance with aspects of the invention. As shown, the environment 200 comprises a computer server 210, a plurality of smart devices 230-1, 230-2, . . . , 230-n, and a plurality of user computing devices 250-1, 250-2, . . . , 250-m which are in communication via a computer network 260. In embodiments, the computer network 260 is any suitable network including any combination of a LAN, WAN, or the Internet. In embodiments, the computer server 210, the plurality of smart devices 230-1, 230-2, . . . , 230-n, and the plurality of user computing devices 250-1, 250-2, . . . , 250-m are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a centralized knowledge management program module 220, which includes hardware and/or software and is one or more of the program modules 42 shown in FIG. 1. According to an embodiment, the centralized knowledge management program module 220 includes program instructions for creating a closed social network group including the plurality of smart devices 230-1, 230-2, . . . , 230-n; receiving metadata from the plurality of smart devices 230-1, 230-2, . . . , 230-n and storing the received metadata in a knowledge corpus 225; receiving activity logs from the plurality of smart devices 230-1, 230-2, . . . , 230-n; analyzing the activity logs and building the knowledge corpus 225; receiving a request from a smart device of the plurality of smart devices 230-1, 230-2, . . . , 230-n for steps to perform a particular activity; obtaining the steps from the knowledge corpus; translating the steps for the smart device of the plurality of smart devices 230-1, 230-2, . . . , 230-n; and sending the translated steps to the smart device of the plurality of smart devices 230-1, 230-2, . . . , 230-n. In embodiments, the program instructions included in the centralized knowledge management program module 220 of the computer server 210 are executed by one or more hardware processors.

Still referring to FIG. 2, in embodiments, each of the plurality of smart devices 230-1, 230-2, . . . , 230-*n* is implemented as hardware and/or software and includes one or more elements of the computer system/server 12 (as shown in FIG. 1). Each of the plurality of smart devices 230-1, 230-2, . . . , 230-*n* is a home appliance device (e.g., cleaning robot, washing machine, etc.) that includes artificial intelligence capabilities and is able to acquire new skills and communicate with other home appliance devices and/or IoT sensors to perform activities in an effective manner. Additionally, each of the plurality of smart devices 230-1, 230-2, . . . , 230-*n* includes specialized hardware and/or software for performing one or more tasks (e.g., floor cleaning, washing clothes, etc.).

In embodiments, each of the plurality of smart devices 230-1, 230-2, . . . , 230-*n* includes a smart device program module 240, which includes hardware and/or software and is one or more of the program modules 42 shown in FIG. 1. According to an embodiment, the smart device program module 240 includes program instructions for communicating with the centralized knowledge management program module 220 of the computer server 210 to perform various functions, including acquiring new skills for performing activities. In embodiments, the program instructions included in the smart device program module 240 of each of the plurality of smart devices 230-1, 230-2, . . . , 230-*n* are executed by one or more hardware processors. In embodiments, each of the plurality of smart devices 230-1, 230-2, . . . , 230-*n* also includes a camera 245, which may be a digital still camera or a digital video camera.

Still referring to FIG. 2, in embodiments, each of the plurality of user computing devices 250-1, 250-2, . . . , 250-*m* is a computer device comprising one or more elements of the computer system/server 12 (as shown in FIG. 1) and is a desktop computer, a laptop computer, a mobile device such as a cellular phone, tablet, personal digital assistant (PDA), or other computing device. In other embodiments, each of the plurality of user computing devices 250-1, 250-2, . . . , 250-*m* is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of the plurality of user computing devices 250-1, 250-2, . . . , 250-*m* includes a user computing device program module 255, which includes hardware and/or software and is one or more of the program modules 42 shown in FIG. 1. According to an embodiment, the user computing device program module 255 includes program instructions for joining a closed social network group and adding one or more of the plurality of smart devices 230-1, 230-2, . . . , 230-*n* to the closed social network group. In embodiments, the program instructions included in the user computing device program module 255 of each of the plurality of user computing devices 250-1, 250-2, . . . , 250-*m* are executed by one or more hardware processors.

Figure 3:
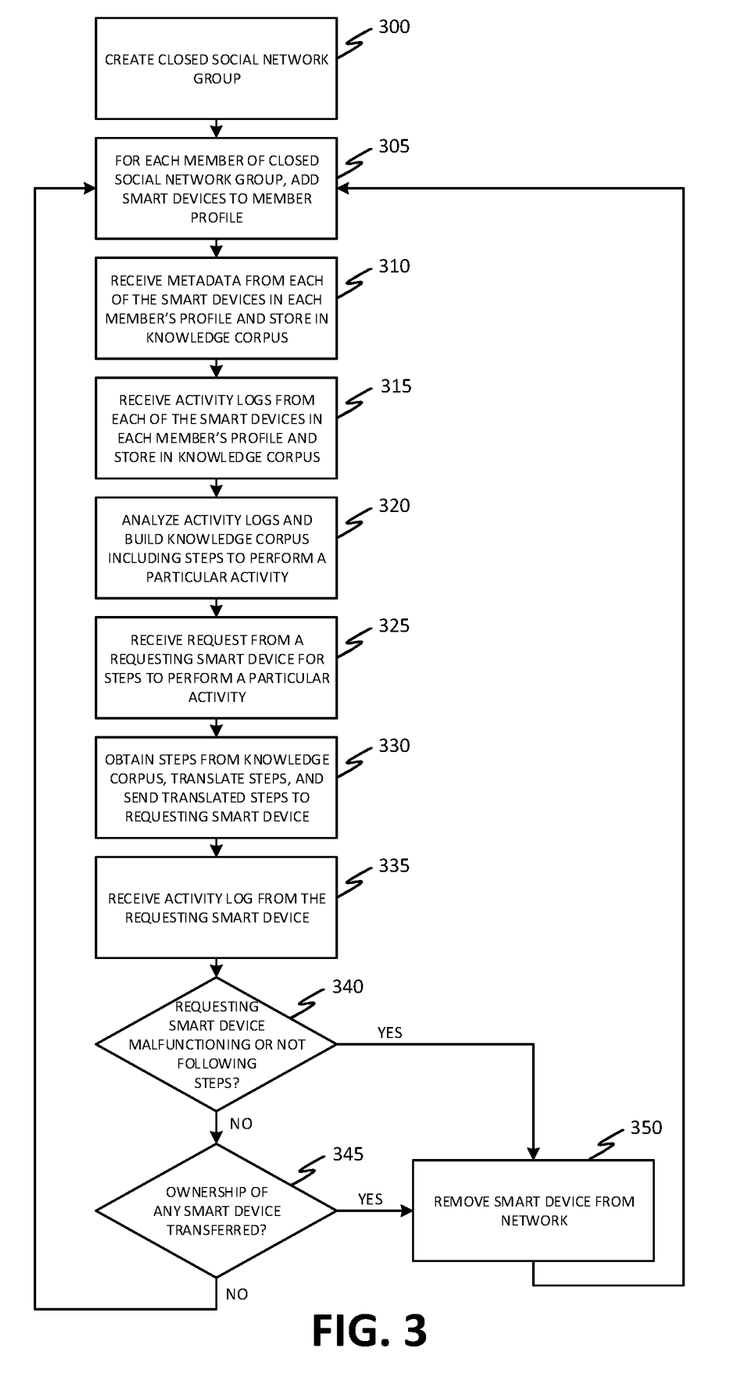
FIGS. 3 and 4 depict flowcharts of exemplary methods performed in accordance with aspects of the invention.

FIG. 3 depicts a flowchart of an exemplary method performed by the centralized knowledge management program module 220 of the computer server 210 in accordance with aspects of the invention. The steps of the method are performed in the environment of FIG. 2 and are described with reference to the elements shown in FIG. 2.

At step 300, the computer server 210 creates a closed social network group. In embodiments, the centralized knowledge management program module 220 receives a request from a user to create a closed social network group via the user computing device program module 255 running on one of the plurality of user computing devices 250-1, 250-2, . . . , 250-*m*. In response to receiving the request, the centralized knowledge management program module 220 creates the closed social network group. The request received from the user computing device program module 255 running on one of the plurality of user computing devices 250-1, 250-2, . . . , 250-*m* may include information about one or more members (users) to be included in the closed social network group and/or membership criteria for the closed social network group (e.g., new members must be approved by the user who created the closed social network group, new members must be approved by a current member of the closed social network group, etc.).

At step 305, for each member of the closed social network group, the computer server 210 adds smart devices to a member profile. In embodiments, the centralized knowledge management program module 220 receives, from each member of the closed social network group via the user computing device program module 255 running on one of the plurality of user computing devices 250-1, 250-2, . . . , 250-*m*, information (e.g., a serial number, MAC address, etc.) that uniquely identifies each of the one or more of the plurality of smart devices 230-1, 230-2, . . . , 230-*n* that are used by and/or owned by the member. The centralized knowledge management program module 220 updates a member profile stored in the knowledge corpus 225 with this information.

At step 310, the computer server 210 receives metadata from each of the smart devices 230-1, 230-2, . . . , 230-*n* in each member's profile and stores the received metadata in the knowledge corpus 225. In embodiments, the centralized knowledge management program module 220 sends a request for the metadata to each of the smart devices 230-1, 230-2, . . . , 230-*n*, either directly or via the user computing device program module 225 running on the user computing devices 250-1, 250-2, . . . , 250-*m*. In response, each of the smart devices 230-1, 230-2, . . . , 230-*n* sends the metadata to the centralized knowledge management program module 220, either directly or via the user computing device program module 225 running on the user computing devices 250-1, 250-2, . . . , 250-*m*. This metadata includes information about each of the smart devices 230-1, 230-2, . . . , 230-*n*, including manufacturer, model, operating system, features, configuration, and/or capacity, etc., and is usable to determine whether or not a smart device of the smart devices 230-1, 230-2, . . . , 230-*n* is compatible with other smart devices of the smart devices 230-1, 230-2, . . . , 230-*n*. The centralized knowledge management program module 220 stores the received metadata in the knowledge corpus 225.

At step 315, the computer server 210 receives activity logs from each of the smart devices 230-1, 230-2, . . . , 230-*n* in each member's profile and stores the received activity logs in the knowledge corpus 225. In embodiments, the centralized knowledge management program module 220 sends a request for the activity logs to each of the smart devices 230-1, 230-2, . . . , 230-*n*, either directly or via the user computing device program module 225 running on the user computing devices 250-1, 250-2, . . . , 250-*m*. In response, each of the smart devices 230-1, 230-2, . . . , 230-*n* sends the activity logs to the centralized knowledge management program module 220, either directly or via the user computing device program module 225 running on the user computing devices 250-1, 250-2, . . . , 250-*m*.

The activity logs may include photographs of actions with respect to the area of action of the smart device 230-1, 230-2, . . . , 230-n, before the activity, while performing the activity, and after performing the activity. The activity logs may also include metadata and information about an activity sequence (e.g., steps) performed by the smart device 230-1, 230-2, . . . , 230-n and information about power consumption by the smart device 230-1, 230-2, . . . , 230-n. Initially, the smart device 230-1, 230-2, . . . , 230-n may receive assistance from a human user in performing the activity, and the activity logs include information about the steps that the smart device 230-1, 230-2, . . . , 230-n has been trained to perform by the human user. For example, if a smart device 230-1, 230-2, . . . , 230-n has not previously cleaned an oily floor, a human user may manually operate the smart device 230-1, 230-2, . . . , 230-n to clean the oily floor. The steps performed during the manual operation of the smart device 230-1, 230-2, . . . , 230-n as well as information about the job that was performed (e.g., oily floor cleaning), pictures of the floor, and attributes derived from the pictures (e.g., describing the condition of the floor) are included in the activity log that is received at step 315. The centralized knowledge management program module 220 then stores the received activity logs and information about the smart device 230-1, 230-2, . . . , 230-n associated with each activity log (including metadata and a profile of the smart device) in the knowledge corpus 225.

At step 320, the computer server 210 analyzes the activity logs and builds the knowledge corpus 235 including the steps to perform a particular activity. In embodiments, the centralized knowledge management program module 220 analyzes the activity logs received at step 315. In particular, the images and associated metadata and any spoken input from a user included in the activity logs are analyzed by the centralized knowledge management program module 220 using cognitive computing techniques including computer vision to recognize objects and conditions in the images (e.g., the floor is oily, a glass item is broken, the dimensions of the broken items are large, the type of soil/dirt on the clothes, etc.) and a sequence of steps performed for a particular activity (e.g., cleaning the oily floor). The centralized knowledge management program module 220 stores, in the knowledge corpus 235 in connection to the particular activity, the information about the recognized objects and conditions and the sequence of steps performed for the particular activity in association with metadata and a profile of the smart device that performed the sequence of steps for the particular activity.

At step 325, the computer server 210 receives a request from a requesting smart device 230-1, 230-2, . . . , 230-n for the steps to perform a particular activity. In embodiments, the centralized knowledge management program module 220 receives the request directly from the requesting smart device 230-1, 230-2, . . . , 230-n or via one of user computing devices 250-1, 250-2, . . . , 250-m. In embodiments, the request includes information about the activity to be performed as well as information identifying the requesting smart device 230-1, 230-2, . . . , 230-n that will perform the activity.

At step 330, the computer server 210 obtains the steps from the knowledge corpus 225, translates the steps, and sends the translated steps to the requesting smart device 230-1, 230-2, . . . , 230-n. In embodiments, the centralized knowledge management program module 220 searches the knowledge corpus 225 for the particular activity that is the subject of the request received at step 325 and retrieves the sequence of steps performed for the particular activity. In embodiments, the centralized knowledge management program module 220 compares a profile of the requesting smart device 230-1, 230-2, . . . , 230-n with information stored in the knowledge corpus 225 about the metadata and the profile of the smart device that performed the sequence of steps for the particular activity and retrieves a stored sequence of steps associated with a smart device that is the same as or similar to (based on capabilities, manufacturer, model, etc.) the requesting smart device 230-1, 230-2, . . . , 230-n. In the event the retrieved sequence of steps is associated with a smart device 230-1, 230-2, . . . , 230-n that is the same as the requesting smart device 230-1, 230-2, . . . , 230-n (based on capabilities, manufacturer, model, etc.), then the centralized knowledge management program module 220 sends the retrieved sequence of steps to the requesting smart device 230-1, 230-2, . . . , 230-n without first performing any translation. On the other hand, if the requesting smart device 230-1, 230-2, . . . , 230-n is similar to but not the same as the smart device 230-1, 230-2, . . . , 230-n associated with the retrieved sequence of steps, then the centralized knowledge management program module 220 translates the retrieved sequence of steps by adapting it to the capabilities of the requesting smart device 230-1, 230-2, . . . , 230-n.

In particular, to translate the retrieved sequence of steps, the centralized knowledge management program module 220 first retrieves from the knowledge corpus 225 information about the requesting smart device 230-1, 230-2, . . . , 230-n, including manufacturer, model, operating system, features, configuration, and/or capacity, etc. The centralized knowledge management program module 220 then uses this information, as well as feedback contained in activity logs received from the smart devices 230-1, 230-2, . . . , 230-n about successful and unsuccessful actions performed (stored at step 350 as described below), to determine whether or not the requesting smart device 230-1, 230-2, . . . , 230-n is capable of performing each step in the sequence of steps.

If the centralized knowledge management program module 220 determines that the requesting smart device 230-1, 230-2, . . . , 230-n is not capable of performing one or more steps in the sequence of steps, then the centralized knowledge management program module 220 adapts the one or more steps in the sequence of steps for the requesting smart device 230-1, 230-2, . . . , 230-n by modifying or adjusting the one or more steps in the sequence of steps for compatibility with the requesting smart device 230-1, 230-2, . . . , 230-n. The knowledge corpus 225 may include information about adaptive steps for a skill corresponding to specific capabilities of similar smart devices that is used in the translation. These adaptive steps may allow for full or partial performance of the requested activity. Additionally, the centralized knowledge management program module 220 may further translate the modified or adjusted sequence of steps into a language or data format that is determined to be compatible with the requesting smart device 230-1, 230-2, . . . , 230-n based on the information stored in the knowledge corpus 225 about the requesting smart device 230-1, 230-2, . . . , 230-n and its capabilities. After the centralized knowledge management program module 220 performs the translation, the translated sequence of steps is transmitted to the requesting smart device 230-1, 230-2, . . . , 230-n, either directly or via one of user computing devices 250-1, 250-2, . . . , 250-m.

In other embodiments, the centralized knowledge management program module 220 determines that a skill cannot be taught to a particular smart device. In this case, the centralized knowledge management program module 220 sends a message to the smart device indicating that the skill cannot be taught to the smart device.

At step 335, the computer server 210 receives an activity log from the requesting smart device 230-1, 230-2, ..., 230-n. In embodiments, the centralized knowledge management program module 220 sends a request for the activity log to the requesting smart device 230-1, 230-2, ..., 230-n, either directly or via the user computing device program module 225 running on one of the user computing devices 250-1, 250-2, ..., 250-m. In response, the requesting smart device 230-1, 230-2, ..., 230-n sends the activity log to the centralized knowledge management program module 220, either directly or via the user computing device program module 225 running on one of the user computing devices 250-1, 250-2, ..., 250-m.

The activity log may include photographs of actions with respect to the area of action of the requesting smart device 230-1, 230-2, ..., 230-n, before the activity, while performing the activity, and after performing the activity. The activity log may also include metadata and information about an activity sequence (e.g., steps) performed by the requesting smart device 230-1, 230-2, ..., 230-n and information about power consumption by the requesting smart device 230-1, 230-2, ..., 230-n. The centralized knowledge management program module 220 stores the received activity log in the knowledge corpus 225.

At step 340, the computer server 210 determines whether or not the requesting smart device 230-1, 230-2, ..., 230-n is malfunctioning or not following the steps. In embodiments, the centralized knowledge management program module 220 analyzes the activity log received at step 335, including images and associated metadata included in the activity log, using cognitive computing techniques including computer vision to recognize objects and conditions in the images (e.g., the floor is oily, a glass item is broken, the dimensions of the broken items are large, the type of soil/dirt on the clothes, etc.) and a sequence of steps performed for a particular activity. The centralized knowledge management program module 220 compares the sequence of steps performed by the requesting smart device 230-1, 230-2, ..., 230-n, as determined from the received activity log, to the sequence of steps sent to the requesting smart device 230-1, 230-2, ..., 230-n at step 330. If the centralized knowledge management program module 220 determines that the requesting smart device 230-1, 230-2, ..., 230-n did not follow the sequence of steps sent to it at step 330 or otherwise did not satisfactorily complete the activity, or if the analysis of the activity log received at step 335 indicates that the requesting smart device 230-1, 230-2, ..., 230-n is malfunctioning, then the flow proceeds to step 350. On the other hand, if the centralized knowledge management program module 220 determines that the requesting smart device 230-1, 230-2, ..., 230-n followed the sequence of steps sent to it at step 330 and is not malfunctioning, then the flow proceeds to step 345.

At step 345, the computer server 210 determines whether or not ownership of any smart device 230-1, 230-2, ..., 230-n has been transferred. In embodiments, the centralized knowledge management program module 220 determines whether or not any asset transfer reports have been received from the user computing devices 250-1, 250-2, ..., 250-n. If any such asset transfer reports have been received, the centralized knowledge management program module 220 determines which of the smart devices 230-1, 230-2, ..., 230-n has been transferred to a new owner using the asset transfer reports. In embodiments, the centralized knowledge management program module 220 also identifies one or more smart devices 230-1, 230-2, ..., 230-n as having been transferred to a new owner based on the smart device no longer being present in a home network of a user associated with one of the user computing devices 250-1, 250-2, ..., 250-n, or based on images received from a camera or information received via near-field communication (NFC).

If the centralized knowledge management program module 220 determines that one or more of the smart devices 230-1, 230-2, ..., 230-n has been transferred to a new owner, then the flow proceeds to step 350. On the other hand, if the centralized knowledge management program module 220 does not determine that one or more of the smart devices 230-1, 230-2, ..., 230-n has been transferred to a new owner, then the flow returns to step 305.

At step 350, the computer server 210 removes from the network any smart devices 230-1, 230-2, ..., 230-n that are determined to be malfunctioning (at step 340) or that are determined to have been transferred to a new owner (at step 345). In embodiments, the centralized knowledge management program module 220 updates the knowledge corpus 225 to include information about a malfunction of a smart device 230-1, 230-2, ..., 230-n or a failure of the smart device 230-1, 230-2, ..., 230-n to satisfactorily complete an activity, including attributes and metadata of the smart device 230-1, 230-2, ..., 230-n. If a smart device 230-1, 230-2, ..., 230-n repeatedly malfunctions, then the centralized knowledge management program module 220 updates the member profiles stored in the knowledge corpus 225 to remove the smart device 230-1, 230-2, ..., 230-n (e.g., after a predetermined number of malfunctions have occurred). Additionally, if a smart device 230-1, 230-2, ..., 230-n repeatedly fails to satisfactorily complete an activity, then at step 330, the centralized knowledge management program module 220 may determine that a skill used to perform the activity cannot be taught to the smart device 230-1, 230-2, ..., 230-n, as discussed above. Additionally, if the smart device 230-1, 230-2, ..., 230-n has been transferred, then the centralized knowledge management program module 220 updates the member profiles stored in the knowledge corpus 225 to remove the transferred smart device 230-1, 230-2, ..., 230-n. Accordingly, the centralized knowledge management program module 220 will no longer accept requests from or send steps to the malfunctioning or transferred smart device 230-1, 230-2, ..., 230-n. Additionally, the centralized knowledge management program module 220 will not add activity logs from the malfunctioning or transferred smart device 230-1, 230-2, ..., 230-n to the knowledge corpus 225. After the member profiles are updated, the flow then returns to step 305.

Figure 4:
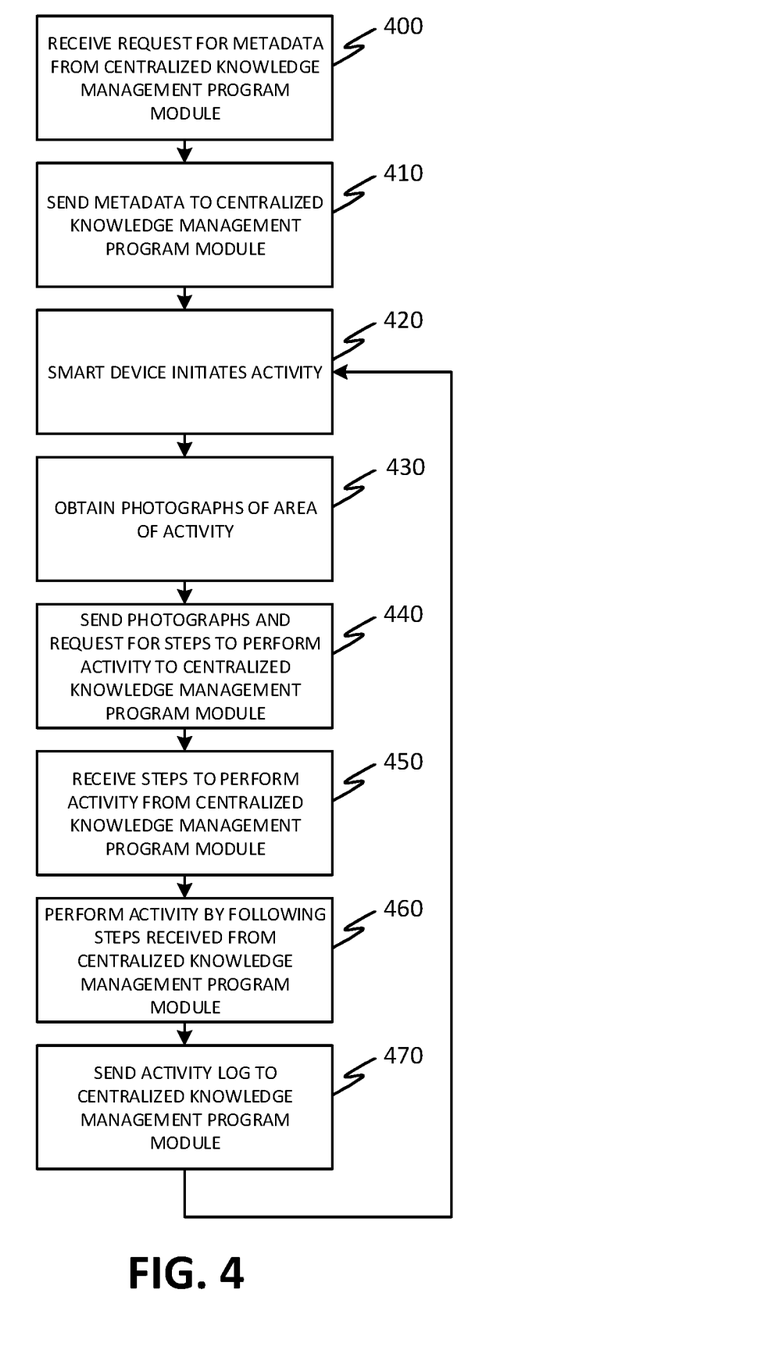

FIG. 4 depicts a flowchart of an exemplary method performed by the smart device program module 240 of each of the smart devices 230-1, 230-2, ..., 230-n in accordance with aspects of the invention. The steps of the method are performed in the environment of FIG. 2 and are described with reference to the elements shown in FIG. 2.

At step 400, the smart device 230-1, 230-2, ..., 230-n receives a request for metadata from the centralized knowledge management program module 220. In embodiments, the smart device program module 240 receives the request for metadata from the centralized knowledge management program module 220, either directly or via the user computing device program module 225 running on the user computing devices 250-1, 250-2, ..., 250-m.

At step 410, the smart device 230-1, 230-2, ..., 230-n sends the metadata to the centralized knowledge management program module 220. In embodiments, the smart device program module 240 sends the metadata to the centralized knowledge management program module 220, either directly or via the user computing device program module 225 running on the user computing devices 250-1, 250-2, . . . , 250-m. This metadata includes information about the smart device 230-1, 230-2, . . . , 230-n, including manufacturer, model, operating system, features, configuration, and/or capacity, etc.

At step 420, the smart device 230-1, 230-2, . . . , 230-n initiates an activity (e.g., floor cleaning, washing clothes, etc.). In embodiments, the smart device program module 240 initiates the activity in response to a request received from a user or from another program module.

At step 430, the smart device 230-1, 230-2, . . . , 230-n obtains photographs of an area of the activity. In embodiments, the smart device program module 240 obtains the photographs using the camera 245 included the smart device 230-1, 230-2, . . . , 230-n. In an example, the photographs of the area of the activity may include photographs of a floor to be cleaned by a floor cleaning smart device or photographs of clothes to be washed by a clothes washing smart device.

At step 440, the smart device 230-1, 230-2, . . . , 230-n sends the photographs of the area of the activity along with a request for steps to perform the activity to the centralized knowledge management program module 220. In embodiments, the smart device program module 240 sends the request for the steps to perform the activity initiated at step 420 with the photographs obtained at step 430 to the centralized knowledge management program module 220, either directly or via one of the user computing devices 250-1, 250-2, . . . , 250-m. The activity may be an activity that the smart device 230-1, 230-2, . . . , 230-n has not previously performed and/or for which any step is missing (i.e., unknown to the smart device 230-1, 230-2, . . . , 230-n).

At step 450, the smart device 230-1, 230-2, . . . , 230-n receives the steps to perform the activity from the centralized knowledge management program module 220. In embodiments, the smart device program module 240 receives the steps to perform the activity initiated at step 420 from the centralized knowledge management program module 220, either directly or via one of the user computing devices 250-1, 250-2, . . . , 250-m. The steps to perform the activity are received in a translated format that is determined to be compatible with the smart device 230-1, 230-2, . . . , 230-n based upon the metadata sent to the centralized knowledge management program module 220 at step 410.

At step 460, the smart device 230-1, 230-2, . . . , 230-n performs the activity by following the steps received from the centralized knowledge management program module 220. In embodiments, the smart device program module 240 follows the translated steps received from the centralized knowledge management program module 220 at step 450 to perform the activity.

At step 470, the smart device 230-1, 230-2, . . . , 230-n sends an activity log to the centralized knowledge management program module 220. In embodiments, the smart device program module 240 sends the activity log to the centralized knowledge management program module 220, either directly or via one of the user computing devices 250-1, 250-2, . . . , 250-m. The activity log may include photographs of actions with respect to the area of action of the smart device 230-1, 230-2, . . . , 230-n, before the activity, while performing the activity, and after performing the activity. The activity log may also include metadata and information about an activity sequence (e.g., steps) performed by the smart device 230-1, 230-2, . . . , 230-n and information about power consumption by the smart device 230-1, 230-2, . . . , 230-n. After sending the activity log, the flow then returns to step 420.

In embodiments, while performing any activity, if a smart device 230-1, 230-2, . . . , 230-n identifies any gap in the knowledge to perform the activity successfully, then the smart device 230-1, 230-2, . . . , 230-n communicates (via the centralize knowledge management program module 220) with same category of devices within the closed social network group to determine if a similar activity has been performed by any of the devices of same category and gather knowledge from those devices in order to learn to perform the activity. In an example, a floor cleaning robot of a first user is cleaning the floor of the first user. While cleaning the floor, the floor cleaning robot determines that the floor is oily, and the floor cleaning robot does not know how to perform the cleaning of the oily floor. Accordingly, the floor cleaning robot communicates with a cleaning robot of a second user (via the centralize knowledge management program module 220) and receives information from the second user's cleaning robot that enables the floor cleaning robot of the first user to clean the oily floor.

In embodiments, using a self-learning method, the smart devices 230-1, 230-2, . . . , 230-n in the closed social network group create the knowledge corpus 225. If another user joins the closed social network group, the existing smart devices 230-1, 230-2, . . . , 230-n in the closed social network group validate the compatibility of the smart devices of the newly joined user in the closed social network group. The centralized knowledge management program module 220 allows compatible smart devices of the newly joined user to be added to the closed social network group to contribute to and use the knowledge corpus 225. However, the centralized knowledge management program module 220 prevents incompatible and untrusted devices from joining the closed social network friend group.

In an example, five friends have created a closed social network group. Each friend in the group has five to seven smart devices that contribute to and use the knowledge corpus 225. If another friend who joins the closed social network group has four smart devices, the centralized knowledge management program module 220 will validate the four smart devices to ensure that they are trusted and compatible before allowing them to join the closed social network group and contribute to and use the knowledge corpus 225.

In embodiments, if any member of the closed social network group transfers ownership of a smart device 230-1, 230-2, . . . , 230-n, then then the other smart devices 230-1, 230-2, . . . , 230-n of the member will recognize that the transferred smart device 230-1, 230-2, . . . , 230-n does not belong to the member and will cause the centralized knowledge management program module 220 to remove the transferred smart device 230-1, 230-2, . . . , 230-n from the closed social network group, preventing it from contributing to or using the knowledge corpus 225. Additionally, if a member of the closed social network group buys a new smart device 230-1, 230-2, . . . , 230-n, then the centralized knowledge management program module 220 will validate the compatibility of the new smart device 230-1, 230-2, . . . , 230-n and add it to the closed social network group, allowing it to contribute to and use the knowledge corpus 225.

In an example, a first user has sold a washing machine. Other smart devices of the first user and/or the centralized knowledge management program module 220 recognize that the relative position of the washing machine has changed and is no longer in the same position. Accordingly, the centralized knowledge management program module 220 removes the washing machine from the closed social network group, preventing it from contributing to or using the knowledge corpus 225. Similarly, if a new smart device 230-1, 230-2, . . . , 230-n is purchased, then the other smart devices 230-1, 230-2, . . . , 230-n and/or the centralized knowledge management program module 220 validate a trust and compatibility status of the new smart device 230-1, 230-2, . . . , 230-n. Based on the validation results, the centralized knowledge management program module 220 determines whether or not the new smart device 230-1, 230-2, . . . , 230-n is to be added to the closed social network group and allowed to contribute to and use the knowledge corpus 225.

In embodiments, based on the execution behavior of any one or more smart devices 230-1, 230-2, . . . , 230-n, and by identifying any deviation from the expected pattern of usage, the centralized knowledge management program module 220 determines whether or not any smart device 230-1, 230-2, . . . , 230-n needs an upgrade, maintenance, or repair. In an example, it is found that a cooking device is not able to properly execute a grill function while cooking, the centralized knowledge management program module 220 determines that the cooking device needs repair, and a message may be sent to a user alerting to the required repair.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computing device from a first smart device of a plurality of smart devices in a closed social network group, a request for steps to perform an activity;
   determining, by the computing device, the steps to perform the activity using a knowledge corpus;
   translating, by the computing device, the steps into a format that is compatible with the first smart device;
   preventing, by the computing device, a second smart device of the plurality of smart devices from using the knowledge corpus from recognition that a position of the second smart device has changed and is no longer in a same position;
   sending, by the computing device, the translated steps to the first smart device;
   in response to determining, by the computer device, that the first smart device did not perform the translated steps, removing the first smart device from the closed social network group; and
   communicating, by the computing device, with other smart devices of a same category within the closed social network group to determine if a similar activity has been performed by any of the other smart devices of the same category.

2. The method according to claim 1, further comprising:
   receiving, by the computing device, activity logs from the plurality of smart devices including the first smart device in the closed social network group;
   analyzing, by the computing device, the activity logs; and
   generating, by the computing device, the knowledge corpus based on the analyzing of the activity logs.

3. The method according to claim 2, wherein the activity logs include photographs of an area of action and information about an activity sequence.

4. The method according to claim 1, further comprising:
   receiving, by the computing device, an activity log from the first smart device; and
   determining, by the computing device, whether or not the first smart device performed the translated steps.

5. The method according to claim 1, wherein the translating the steps into the format that is compatible with the first smart device comprises:
   retrieving, by the computing device, information about features of the first smart device from the knowledge corpus;
   determining, by the computing device, that the first smart device is not capable of performing the steps based on the information about the features of the first smart device; and
   modifying, by the computing device, the steps for compatibility with the first smart device.

6. The method according to claim 5, further comprising the computing device translating the modified steps into a language or data format that is determined to be compatible with the first smart device.

7. A system comprising:
   a hardware processor, a computer readable memory, and a computer readable storage medium associated with a computing device;
   program instructions configured to receive, from a first smart device, a request for steps to perform an activity;
   program instructions configured to determine the steps to perform the activity using a knowledge corpus;
   program instructions configured to translate the steps into a format that is compatible with the first smart device;
   program instructions configured to send the translated steps to the first smart device; and program instructions configured to prevent a different smart device of a plurality of smart devices from using the knowledge corpus from recognition that a position of the different smart device has changed, wherein the first smart device and the plurality of smart devices are in a closed social network group; and program instructions configured to communicate with other smart devices of a same category within the closed social network group to determine if a similar activity has been performed by any of the other smart devices of the same category, wherein the program instructions are stored on the computer readable storage medium for execution by the hardware processor via the computer readable memory.

8. The system according to claim 7, further comprising:

program instructions configured to receive activity logs from the plurality of smart devices including the first smart device in the closed social network group;

program instructions configured to analyze the activity logs; and program instructions configured to generate the knowledge corpus based on the analyzing of the activity logs.

9. The system according to claim 8, wherein the activity logs include photographs of an area of action and information about an activity sequence.

10. The system according to claim 7, further comprising:

program instructions configured to receive an activity log from the first smart device; and program instructions configured to determine whether or not the first smart device performed the translated steps.

11. The system according to claim 10, further comprising program instructions configured to, in response to determining that the first smart device did not perform the translated steps, remove the first smart device from a closed social network group.

12. The method according to claim 1, further comprising identifying a gap in knowledge to perform the activity.

13. The method according to claim 12, further comprising gathering knowledge from the other smart devices of the same category to learn to perform the activity.

14. The method according to claim 13, further comprising removing the second smart device from the closed social network group, wherein the removing the second smart device from the closed social network group prevents the second smart device from using the knowledge corpus.

15. The method according to claim 14, further comprising validating whether a new smart device is trusted with the other smart devices of the closed social network group.

16. The method according to claim 15, further comprising validating whether the new smart device is compatible with the other smart devices of the closed social network group.

17. The method according to claim 15, further comprising determining to add the new smart device to the closed social network group based upon validation results of trust and compatibility.

18. The system according to claim 10, further comprising program instructions configured to identify a deviation from an expected pattern of usage from the first smart device for execution behavior of the first smart device.

19. The system according to claim 18, further comprising program instructions configured to determine the first smart device needs an update based on the execution behavior.

\* \* \* \* \*